(12) United States Patent
Wenzkowski

(10) Patent No.: US 11,231,337 B2
(45) Date of Patent: Jan. 25, 2022

(54) METHOD FOR DETECTING A TENSILE STRESS OF A CIRCUMFERENTIAL BELT

(71) Applicant: Texmag GmbH Vertriebsgesellschaft, Thalwil (CH)

(72) Inventor: Juergen Wenzkowski, Augsburg (DE)

(73) Assignee: Texmag GmbH Vertriebsgesellscaft, Thalwil (CH)

(*) Notice: Subject to any disclaimer, the term of this patent is extended or adjusted under 35 U.S.C. 154(b) by 85 days.

(21) Appl. No.: 16/882,822

(22) Filed: May 26, 2020

(65) Prior Publication Data

US 2020/0386638 A1 Dec. 10, 2020

(30) Foreign Application Priority Data

Jun. 7, 2019 (DE) ...................... 10 2019 004.034.1

(51) Int. Cl.
*G01L 5/06* (2006.01)

(52) U.S. Cl.
CPC ...................... *G01L 5/06* (2013.01)

(58) Field of Classification Search
CPC . G01M 17/0072; G03G 15/2042; G01L 5/06; A21C 3/02; B29C 66/836; A63B 23/03533; F16H 7/1254
See application file for complete search history.

(56) References Cited

U.S. PATENT DOCUMENTS 3,935,941 A * 2/1976 Keck ...................... B65G 21/14
198/812
5,733,214 A 3/1998 Shiki et al.
7,059,984 B2 * 6/2006 Vaeth ...................... D21F 7/005
474/101
8,020,468 B2 * 9/2011 Yang ...................... F16H 7/1254
74/490.04
8,913,906 B2 * 12/2014 Suzuki ............... G03G 15/1615
399/39

(Continued)

FOREIGN PATENT DOCUMENTS

| AT | 273540 | 8/1969 |
| DE | 41 26 143 | 11/1993 |
| DE | 203 11 822 | 11/2003 |

OTHER PUBLICATIONS

German Search Report for application 10 2019 004 034.1, dated Feb. 12, 2020.

*Primary Examiner* — Max H Noori
(74) *Attorney, Agent, or Firm* — Joseph E. Maenner; Maenner & Associates, LLC

(57) ABSTRACT

In the case of a method for detecting a tensile stress of a circumferential belt (5), this is deflected around a tension roller (4). In this way, the running length of the circumferential belt (5) is changed by adjusting the tension roller (4). A force measuring device (10) is provided, wherein the force measurement changes along with the adjustment path (6) of the tension roller (4). In order to make a reliable tensile stress detection possible, the sensitivities of the force measuring device (10) are determined with respect to the tensile stress for different points of the adjustment path. These sensitivities or calculated values are stored in a memory (32), which a controller (15) accesses. This calculates the tensile stress from the current adjustment path (6), the current bearing force and the stored sensitivities or values by means of interpolation.

9 Claims, 6 Drawing Sheets

(56) References Cited

U.S. PATENT DOCUMENTS

| | | | |
|---|---|---|---|
| 2002/0151261 A1* | 10/2002 | Liou | B24B 21/20 |
| | | | 451/311 |
| 2004/0245363 A1* | 12/2004 | Vaeth | D21F 7/005 |
| | | | 242/417 |
| 2005/0254857 A1* | 11/2005 | Lee | G03G 15/754 |
| | | | 399/165 |
| 2009/0188212 A1* | 7/2009 | Nowakowski | B65H 35/10 |
| | | | 53/435 |
| 2013/0206549 A1* | 8/2013 | Clevers | B41J 11/007 |
| | | | 198/807 |
| 2020/0241458 A1* | 7/2020 | Maeno | G03G 15/1615 |

* cited by examiner

METHOD FOR DETECTING A TENSILE STRESS OF A CIRCUMFERENTIAL BELT

CROSS-REFERENCE TO RELATED APPLICATION

The present application claims priority to German Patent Application no. 10 2019 004 034.1, filed Jun. 7, 2019, which is incorporated herein by reference in its entirety.

FIELD OF THE INVENTION

The invention relates to a method for detecting the tensile stress of a circumferential belt, which is deflected by at least one tension roller. This tension roller is adjustable and connected to a force measuring device, which detects the bearing force of the tension roller.

BACKGROUND OF THE INVENTION

A generic method is known from DE 10 2015 008 219 A1. In the case of the method, a circumferential belt is deflected by several rollers, wherein one of which is adjustable as a tension roller and is formed as a force measuring roller. Thus, the force measurement direction changes along with the adjustment movement, whereby the force measurement value measured by the force measuring device can no longer be exactly associated with a tensile stress. The said publication therefore proposes to at least partially compensate the effect of the different measuring direction by means of a suitable arrangement of the rollers with an effect due to a varying wrapping angle of the tension roller. However, this compensation does not work completely so that a systematic measurement error remains. This is perceived as being detrimental. In addition, there are installation situations in which the arrangement in accordance with the aforementioned publication is not feasible or only can only be implemented with quite a great deal of effort. Even for such applications, however, there is a desire to implement tensile stress detection on a reliable level.

BRIEF SUMMARY OF THE INVENTION

The object of the invention is to create a method of the aforementioned type, which is characterized by a high level of accuracy and wide range of applicability.

According to the invention, this task is achieved by means of the following features.

The method of the invention is used for detecting a tensile stress of a circumferential belt. Preferably, this circumferential belt is designed as an endless belt, which has neither a beginning nor an end. Such belts are mainly used in paper machines for de-watering paper webs. The circumferential belt is deflected by at least one tension roller. This at least one tension roller is adjustable in order to implement a change of a running length of the circumferential belt in this way. The concrete path of the adjustment movement of the tension roller is basically arbitrary. If the at least one tension roller is immersed deeper into the circumferential belt, the wrapping angle of at least one tension roller increases on the one hand, and, on the other, the path, meaning the running length that the circumferential belt must deal with along a revolution. This measure can change the tensile stress of the circumferential belt. In order to be able to make this change in a targeted manner, at least one force measuring device is provided that measures a bearing force of at least one tension roller. The measurement is carried out in at least one force measuring direction, which, in turn, depends on the location of at least one tension roller. Only in this way can a compact construction with as few components as possible be implemented since the at least one tension roller serves both as an actuator for changing the tensile stress and as a sensor for measuring it. However, the various changes in the wrapping and force direction influence the measurement result of at least one force measuring device. Nevertheless, in order to make a reliable and reproducible assertion concerning the actual tensile stress of the circumferential belt, the sensitivity of at least one force measuring device with respect to the tensile tension of the circumferential belt is determined for a plurality points of the adjustment path. These determined sensitivities implement, in a sense, support points, which represent the course of the function of the sensitivity from the adjustment path. These sensitivities and/or values calculated therefrom are stored as an array in at least one memory that at least one controller accesses. Thus, the at least one controller has a representation of the sensitivity function from the adjustment path available, which is, however, limited to a discrete number of points of the adjustment path. Storing the sensitivity for every imaginable point of the adjustment path requires a fairly large memory area, which is usually not available. In addition, this would involve a considerable computational effort to determine the sensitivities. Rather, the at least one controller calculates the tensile stress from the stored sensitivities and/or values together with the current adjustment path of at least one tension roller via interpolation. In this way, a surprisingly low computational effort results so that relatively simple controllers with low a low level of computing power can be used. In addition, this method requires only a fairly manageable memory so that the method can be implemented efficiently and cost-effectively.

An easy way to determine the sensitivities at the points of the adjustment path is by determining both the force measurement values as well as tensile stress measurement values depending on the adjustment path and the corresponding sensitivities be calculated from this. In this experimental procedure, an additional tensile stress sensor must be provided for the determination of the sensitivities, which can be integrated, for example, into the circumferential belt. In particular, a strain gauge is intended here. This belt, which is equipped with the additional sensor, is not required during normal operation, and is exclusively used to obtain the required sensitivities. The sensitivities themselves can be easily calculated as a quotient of the tensile stress measurements to the force measurements.

Alternatively, it is favourable if the sensitivities at the points of the adjustment path are calculated from geometric conditions. The geometrical wrapping of the at least one tension roller is determined as a function of the adjustment path. Although this is quite complex mathematically, it leads to exact sensitivities without any measurement errors or tolerances affecting the result. The rather high level of mathematical effort associated therewith also has to be carried out only before commissioning since only the sensitivities resulting therefrom are referred to during operation.

For the mathematical calculation of sensitivities, it is expedient to use the wrapping angle of the belt around the at least one tension roller and an inclination angle of at least one force measuring device. The desired sensitivities can be calculated from this.

In particular, if the at least one controller provides only a low level of computing power but a relatively high level of disk space, it is favourable if the interpolation is carried out in a linear manner. In this way, only a few and therefore quickly executable computing operations are required. The disadvantage, however, is that in order to represent the sensitivity function from the adjustment path, quite a large number of sensitivity values must be stored.

A significant improvement with regard to the required memory requirement is obtained by using square polynomials as interpolation functions. This increases the computational effort, but this disadvantage is compensated by the much smaller number of required sensitivity values.

In most use cases, the function of the sensitivities from the adjustment path is mathematically benign, so that it can be easily interpolated by a single polynomial. This polynomial then has a degree that is 1 less than the number of stored sensitivities. Since this polynomial then extends over the entire adjustment range, the computational effort for interpolation is surprisingly low. In particular, it should be taken into account that only a very small number of sensitivities is necessary in this case so that the interpolation polynomial is fairly manageable to a certain extent.

For the adjustment of at least one tension roller, a pivoting around a pivot axis is well-established. This results in a simple mounting of at least one tension roller and, at the same time, a compact construction. In addition, by selecting the attack point of the actuator, a certain increase or reduction of transmission can also be implemented.

Alternatively, the adjustment of at least one tension roller can also be done in the form of a sliding movement. For this purpose, preferably a sliding carriage is used, in which the at least one tension roller is guided.

This has the advantage that the angle of inclination of at least one tension roller does not change over the adjustment path. This results in a lower dependence of the sensitivity on the adjustment path. The disadvantage, however, is the increased effort required for mounting implementation.

BRIEF DESCRIPTION OF DRAWINGS

Other advantages and characteristics of this invention will be explained in the detailed description below with reference to the associated figures that contain several embodiments of this invention. It should however be understood, that the figure is just used to illustrate the invention and does not limit the scope of protection of the invention.

DETAILED DESCRIPTION OF THE INVENTION

Figure 1:
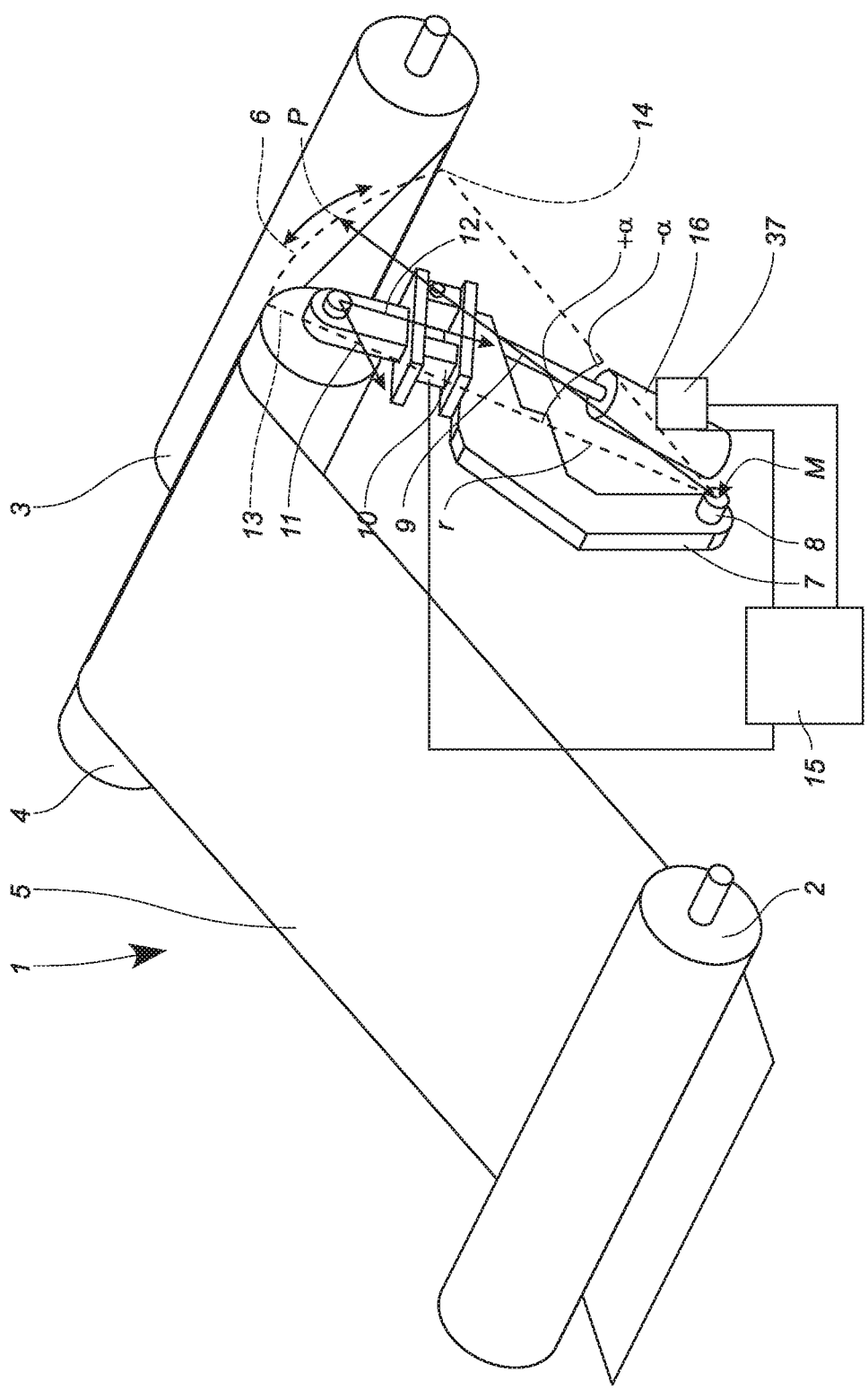
FIG. 1 a schematic, spatial representation of a device for clamping a circumferential belt at a first end point, FIG. 2 the device according to the invention in accordance with FIG. 1 at a second end point, FIG. 3 an alternative embodiment of the device in accordance with FIG. 1 at the first end point, FIG. 4 the device according to the invention in accordance with FIG. 3 at the second end point, FIG. 5 a first embodiment of a force measuring device, FIG. 6 a second embodiment of a force measuring device and FIG. 7 a principle circuit of a controller.
Figure 2:
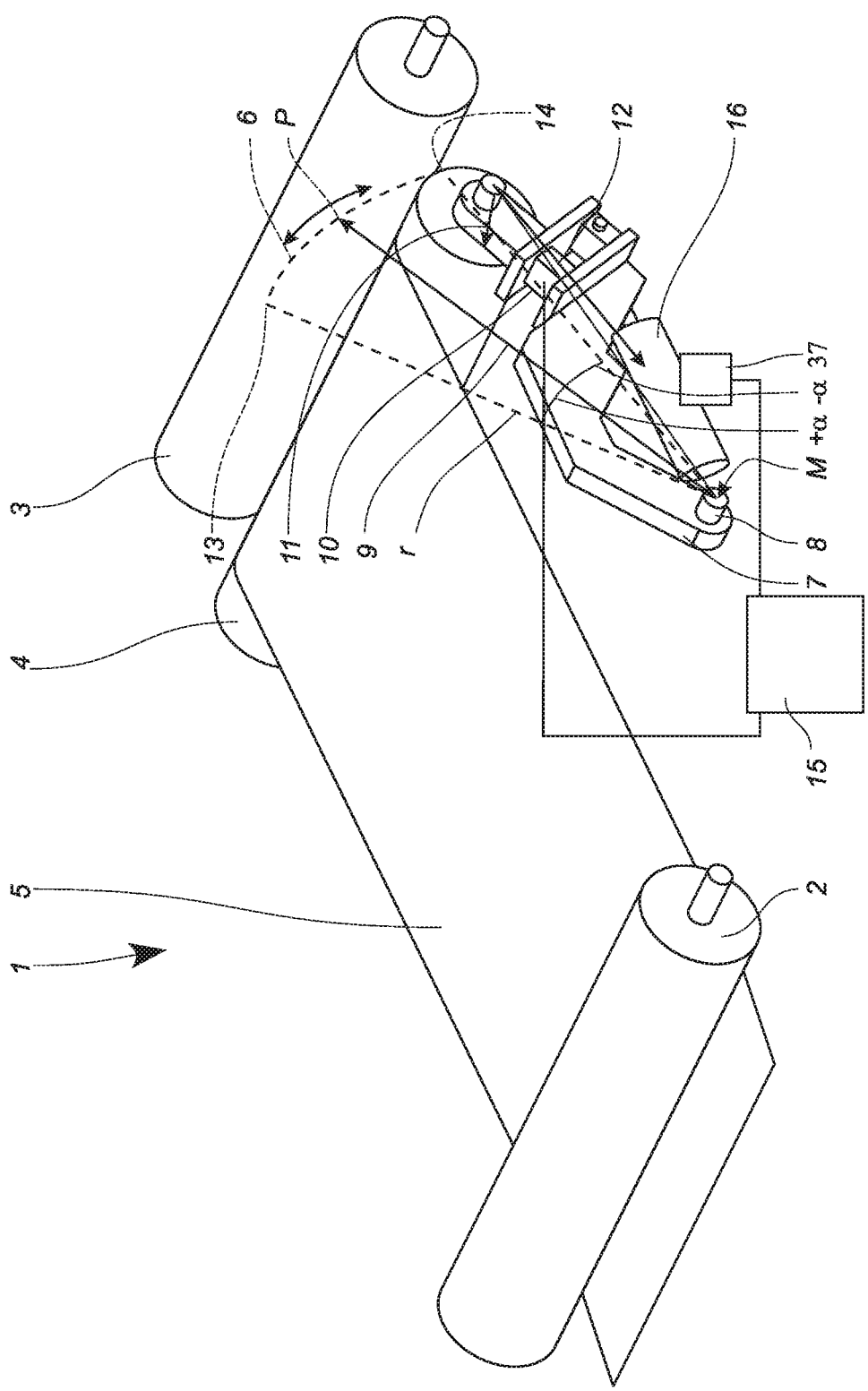

The device in accordance with FIGS. 1 and 2 comprises a first guide roller 2 and a second guide roller 3, between which a tension roller 4 is provided. The guide rollers 2, 3 and the tension roller 4 deflect a circumferential belt 5, wherein the tension roller 4 is adjustable along an adjustment path 6. The length of the orbital path of the circumferential belt 5 can be adjusted by means of this in order to set it to the necessary tension. For adjusting the circumferential belt 5, the tension roller 4 is held on a pivoting setting support 7. This is steered on a pivot axis 8, which forms a centre point M of the adjustment path 6. A spacing 9 between the pivot axis 8 and an outer contour of the tension roller 4 forms a radius r of the adjustment path 6.

This pivot bearing of the tension roller 4 is usually very easy to implement by providing a corresponding rotary bearing at the pivot axis 8. These results in a very robust structure, wherein an edge of the setting support 7 is reliably prevented when forces occur that are not directed in the adjustment direction. A further advantage of this geometry arises in a very compact construction, which is particularly valuable when subjected to confined space.

The tension roller 4 is coupled to the setting support 7 via a force measuring device 10. This detects the bearing force 12 of the tension roller 4 in a measuring direction 11. Thus, the force measuring device 10 of the vectorial bearing force 12 only detects that component that is projected in the direction of the measuring direction 11. On the other hand, a force component of bearing force 12 directed perpendicular to the measuring direction 11 is, in contrast, not detected on a technical measurement level. In special installation situations, it can definitely occur that the measuring direction 11 is equal to the perpendicularly directed force component of the bearing force 12. However, this is only the case in very special installation situations. In general, however, it is to be assumed that a force component other than the desired force component of bearing force 12 is measured.

FIG. 1 shows the tension roller 4 in a first end position, in which the setting support 7 is pivoted by +a. FIG. 2 shows the tension roller 4 in a second end position, in which the setting support 7 is pivoted by −a. These end positions define end points 13, 14 of the adjustment path 6. In the middle, between the end positions, there is a working point P, which is spaced away from the centre point M of the pivot movement.

In addition, a controller 15 is shown, which detects the measuring signals of the force measuring device 10 and a sensor 37 for detecting the position of the tension roller 4. The controller 15 returns a correction value to a setting device 16, which causes the adjustment of the tension roller 4.

Figure 3:
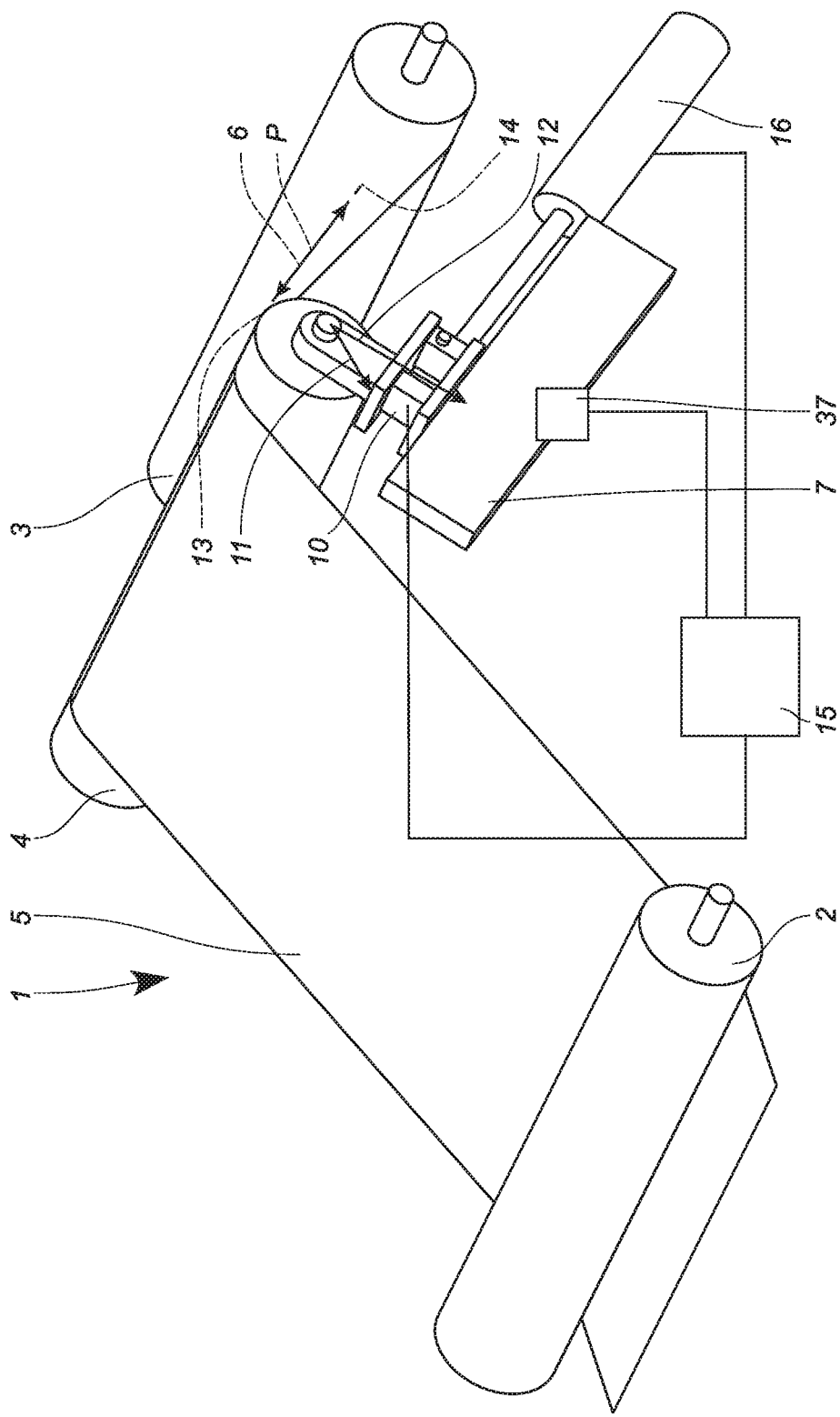
Figure 4:
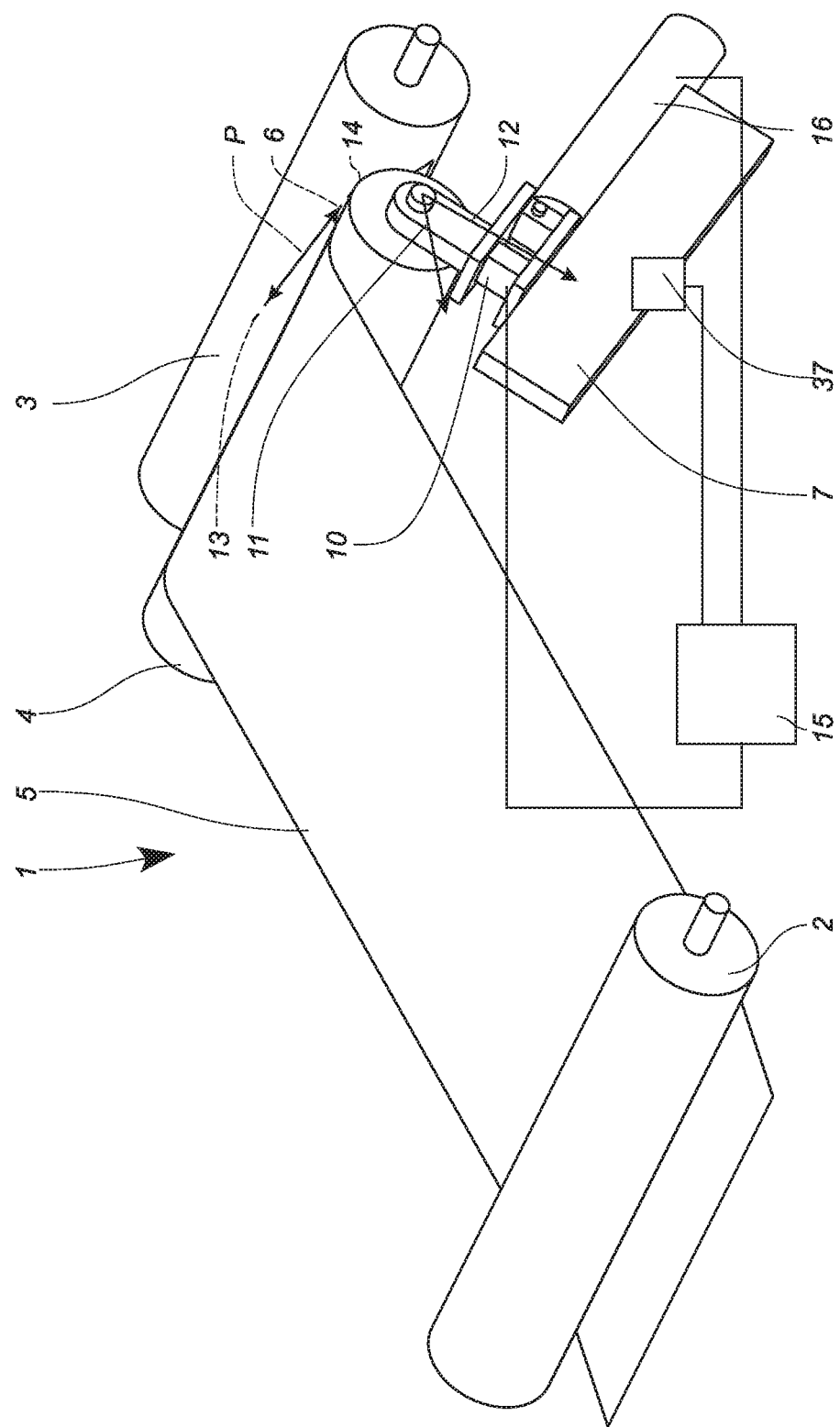

FIGS. 3 and 4 show an alternative embodiment of the device 1 in accordance with FIGS. 1 and 2, wherein the same reference numbers name identical parts. In the following, only the differences to the embodiment in accordance with FIGS. 1 and 2 are discussed.

In the embodiment in accordance with FIGS. 3 and 4, the setting support 7 is a sliding carriage so that the adjustment path 6 is a linear displacement movement between the two end points 13, 14. This results in quite simple geometric conditions since the measuring direction 11 no longer depends on the position of the tension roller 4.

Figure 5:
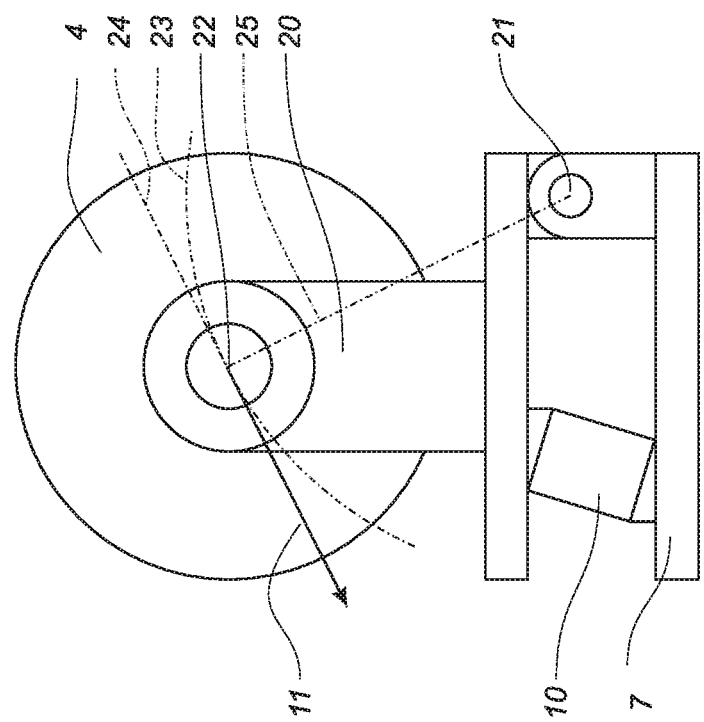

FIG. 5 shows a first embodiment of a tension roller 4 with a force measuring device 10. The tension roller 4 is rotatably supported in a bearing bracket 20. The bearing bracket 20 is connected via a pivot bearing 21 to the setting support 7. Between the bearing bracket 20 and the setting support 7, the force measuring device 10 is provided, which measures the bearing force between the bearing bracket 20 and the setting support 7.

Due to the pivot bearing of the bearing bracket 20, an axis 22 of the tension roller 4 can be pivoted only around pivot bearing 21 with respect to the force measurement. Other movements of axis 22 are not possible. Thus, the axis 22 can be adjusted in terms of force measurement only along a circle 23. However, as a rule, only a very small section of this circle 23 is actually realized since usual force measuring devices 10 require a relatively small adjustment distance. Consequently, the circle 23 corresponds essentially to a tangent 24, which comes into contact with the circle 23 in the range of axis 22. Accordingly, this tangent 24 forms the measuring direction 11 of the force measuring device 10. It is, in particular, independent of the concrete orientation of the force measuring device 10 between the bearing bracket 20 and the setting support 7. Accordingly, the force measuring device 10 could be arranged in this embodiment in any way without affecting the measuring direction 11. The measuring direction 11 is determined exclusively by the pivot bearing 21 and is always perpendicular on a straight line 25 between the pivot bearing 21 and the axis 22 of the tension roller 4. Alternatively, a plurality of force measuring devices 10 can also be provided.

Figure 6:
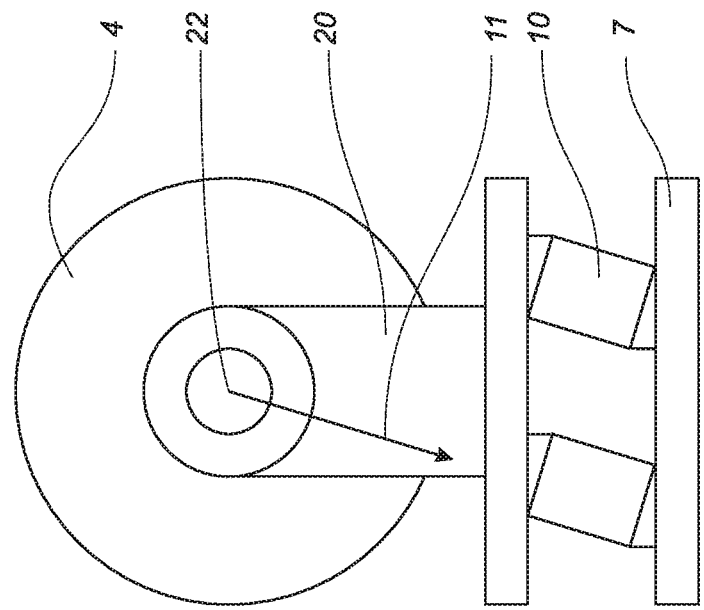

FIG. 6 shows an alternative embodiment of the tension roller 4 with the force measuring device 10, wherein the same reference numbers name identical parts. In the following, only the differences to the embodiment in accordance with FIG. 5 are discussed.

In the embodiment in accordance with FIG. 6, force measuring devices 10 are arranged directly between the bearing bracket 20 and the setting support 7. Thus, the force measuring devices 10 themselves determine the measuring direction 11.

In the exemplary embodiment in accordance with FIG. 6, it is assumed that the force measuring devices 10 can only detect forces in the direction of their longitudinal extension so that the measuring direction 11 in this case is slightly inclined towards the vertical. By other adjusting the force measuring device 10, the measuring direction 11 can be changed as desired. Alternatively, only a single force measuring device 10 can also be provided.

Figure 7:
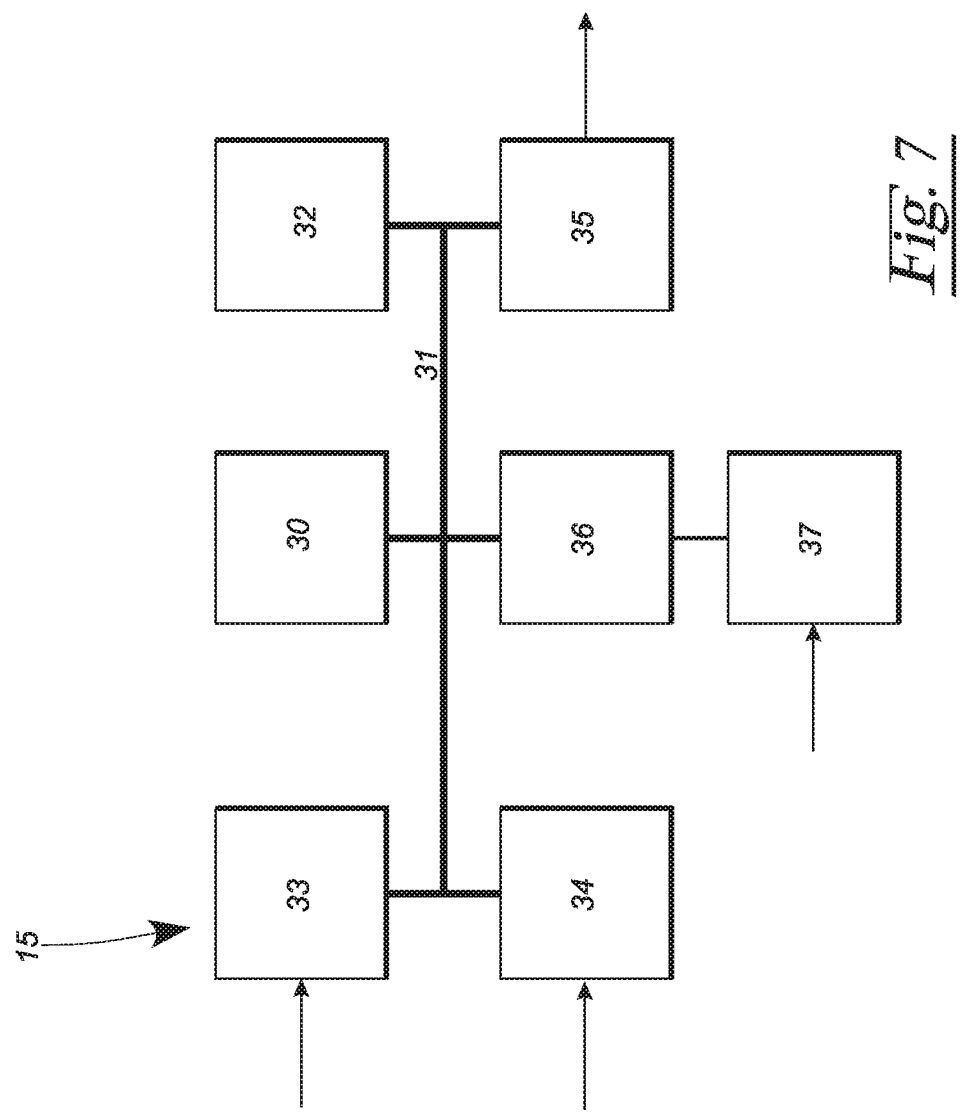

The structure of the controller 15 is explained in more detail based on the principle circuit in accordance with FIG. 7. The controller 15 has a CPU 30 that performs all control, verification, and calculation tasks. It forms the central component of the controller 15. The CPU 30 is connected to a memory 32 via a bus 31. In this memory 32, a program readable by the CPU 30 as well as data are stored. Via the bus 31, the CPU 30 is also connected to input ports 33, 34 and an output port 35. The input port 33 is used to enter a target value for the tensile stress of the circumferential belt 5. The input port 34, on the other hand, accepts the measured value of the force measuring device 10 in analogue or digital form. An output value is output via the output port 35, which directly controls the setting device 16.

The controller 15 still needs the position of the tension roller 4 to determine the correct tensile stress. For this purpose, controller 15 has another input port 36, which is connected to the bus 31. Via this input port 36, the controller 15 receives this information from the sensor 37, which directly measures the position of the tension roller 4. This sensor 37 is preferably an angle or position sensor. In the event that the controller 15 additionally also assumes a control function for clamping force control, the input port 36 and the sensor 37 can be dispensed with if necessary. In this case, it is also quite conceivable to use the output value for the control of the tension roller 4 in order to use it as the position value of the tension roller 4. This procedure is feasible because the position of the tension roller will always be close to the calculated correction value. In addition, small deviations in the position of the tension roller 4 play only a minor role in the calculation of the tensile force of the circumferential belt 5. Thus, a certain error in determining the position of the tension roller 4 is tolerable. In the case of a control function of the controller 15, however, the input port 36 and the sensor 37 can still be implemented. In any case, the additional expenditure involved is limited. In addition, the entire device 1 can be used much more universally.

In memory 32, the sensitivities or polynomial coefficients for interpolation are stored between the determined sensitivities. In the latter case, the CPU 30 only needs to evaluate the polynomial, which is represented by the polynomial coefficients, for the current adjustment movement in order to calculate the sensitivity. This can then be easily multiplied by the measured value of the force measuring device 10. The result of this calculation is the correspondingly corrected tensile stress, which is output at output port 35. If, on the other hand, the sensitivities themselves are stored in memory 32, the CPU 30 must calculate the corresponding polynomial coefficients in real time.

The interpolation polynomial is calculated in accordance with the following formula:

$$P_n(\alpha) = \sum_{i=0}^{n} L_i(\alpha) \cdot e_i$$

In it are the predetermined sensitivities and $L_i$ the Lagrangian polynomials. The Lagrangian polynomials are calculated in accordance with the following formula:

$$L_i(\alpha) = \frac{\prod_{j=0, j \neq i}^{n} (\alpha - \alpha_j)}{\prod_{j=0, j \neq i}^{n} (\alpha_i - \alpha_j)}$$

The sensitivities of the individual adjustment movements are determined either experimentally by measuring the tensile tension or theoretically from the concrete geometry for each individual adjustment movement. In the latter case, it is calculated which force acts on the force measuring device 10 at each individual adjustment movement and given belt pulling force. The assumed belt pulling force divided by the result of this calculation then results in the adjustment movement-dependent sensitivity.

Since some of the embodiments of this invention are not shown or described, it should be understood that a great number of changes and modifications of these embodiments is conceivable without departing from the rationale and scope of protection of the invention as defined by the claims.

What is claimed is:

1. A method for detecting a tensile stress of a circumferential belt having a running length, and being deflected by at least one tension roller having a position, the method comprising the steps of:

adjusting the at least one tension roller for changing the running length of the circumferential belt around an adjustment path, wherein said at least one tension roller has a bearing force and at least one force measuring device has at least one direction of detection, the at least one direction of detection depending on the position of the at least one tension roller, the adjustment path having a plurality of points, the force measuring device measuring the bearing force in the at least one direction of detection, at least one controller having access to at least one memory, the at least one force measuring device having a number of stored sensitivities with reference to the tensile stress, determining the sensitivities for each of the plurality of points of the adjustment path respectively, storing the values in an array in the at least one memory, the values being at least one of the sensitivities and calculated from the sensitivities, and the controller calculating a result for the tensile stress from the position, the bearing force, and the stored values by means of interpolation.

2. The method according to claim 1, wherein calculating the sensitivities comprises calculating the sensitivities at the points of the adjustment path from the force measurements and the tensile stress measurements.

3. The method according to claim 1, wherein calculating the sensitivities at the points of the adjustment path comprises calculating the sensitivities from geometric conditions.

4. The method according to claim 3, wherein the belt has a wrapping angle around the at least one tension roller and the at least one force measuring device has an inclination angle, and wherein calculating the sensitivities at the points of the adjustment path comprises calculating the sensitivities from the wrapping angles and the inclination angle.

5. The method according to claim 1, wherein the interpolation is linear.

6. The method according to claim 1, wherein the interpolation is quadratic.

7. The method according to claim 1, wherein the interpolation uses an interpolation polynomial, wherein the interpolation polynomial possesses a degree that is one less than the number of stored sensitivities.

8. The method according to claim 1, wherein the at least one tension roller has a pivot axis and the at least one tension roller has a pivoted axis and wherein the at least one tension roller is pivoted around the pivot axis.

9. The method according to claim 1, wherein the at least one tension roller is moved in a linear manner.

* * * * *